Patented June 9, 1942

2,285,449

UNITED STATES PATENT OFFICE 2,285,449

METHOD OF PRODUCING SOLS AND AEROGELS

Morris D. Marshall, Allston, Mass., assignor to Monsanto Chemical Company, St. Louis, Mo., a corporation of Delaware No Drawing. Application May 8, 1939, Serial No. 272,404

14 Claims. (Cl. 252—306)

This invention relates to new organosols and to a new and improved method for producing aerogels.

There is disclosed in United States Patent 2,093,454, dated September 21, 1937, to Samuel S. Kistler, new aerogel compositions and methods for preparing them. These aerogels are produced by precipitating a colloidal substance, such as silica, in a liquid as a gel, confining the resulting product in an autoclave and heating the same until the liquid in the gel has reached a temperature at which the surface tension of the liquid is so small as to produce no substantial shrinkage of the gel when the vapor is allowed to escape. The vapor is then slowly released from the autoclave so as not to injure the internal structure of the gel. In this way the skeleton structure of the gel is preserved approximately in its original porous state and the product is a light, fluffy powder, the void spaces of which may range from the usual thirty per cent. to fifty per cent. found in all commercial gels up to ninety-nine per cent. or higher.

The object of the instant invention is to provide an improved process for preparing aerogels which may be more easily operated to form a product of comparable quality, and to new organosols which are produced as intermediates by this process.

In the preparation of aerogels by the Kistler process colloidal silica, for example, is first precipitated as a gel from a colloidal solution (formed by admixture of a mineral acid and an alkali silicate solution). The inorganic salt formed by such precipitation is then removed by washing, and the aqueous medium in which the gelation is carried out is then replaced by another solvent, miscible therewith, which has a more satisfactory critical temperature. This replacement is usually performed by washing the hydrogel countercurrently with the water-miscible solvent. In the preparation of aerogels this solvent is usually alcohol because of its relatively satisfactory critical temperature and ready availability. The alcogel is then autoclaved, as described in the patent, to form the aerogel product.

According to the present invention, the colloidal solution is prepared as before but gelation is prevented by proper control of pH. Before the sol has solidified to the gel form, an organic solvent, miscible with water, is added to give a mixed hydro-organo sol. It will be found that the addition of this organic solvent causes the inorganic salt to precipitate and upon removal thereof a stable sol is obtained which may be kept in that condition for relatively long periods of time. This sol may be autoclaved in the same way that the alco or other gels are treated by the Kistler process to give an aerogel product which is in every way comparable to that produced by the Kistler process.

The following is a specific example of the preparation of a silica aerogel by means of the formation of a stable organosol composition.

*Example I.*—Three hundred fifty-eight pounds of sodium silicate comprising 28.7% $SiO_2$, 8.9% $Na_2O$ and 62.4% $H_2O$ are diluted with one hundred sixty-two pounds of water. This mixture is added to one hundred sixty-three and one-half pounds of 31% sulfuric acid and the mass is agitated to distribute the silicate throughout the acid. This mixing is carried out in a suitable acid resistant apparatus, forming a silica sol. Nine hundred pounds or more of commercial ethyl alcohol are then added. It will be found that the sodium sulfate precipitates on the addition of this alcohol and the liquid phase may be removed by decantation, filtration or centrifuging. The resulting alcohol-water sol is relatively stable and may be kept in that form over long periods of time. This alco-aqua sol may be directly autoclaved in the usual manner to give a product in every way comparable to that prepared by the Kistler process and which contains a low concentration of $Na_2SO_4$ dependent upon the quantity of alcohol used. Proportions of less than one per cent. based on weight of $SiO_2$ are readily obtained.

By the use of the instant process the washing of the gel with water to remove the sodium sulfate and the subsequent washing with alcohol to displace the water in the gel with the former, preparatory to autoclaving, are eliminated, thus permitting a substantial saving in labor as well as in material costs since it will be found that there is a much smaller quantity of weak alcohol to be recovered.

The present process makes possible a variation in the density of the final aerogel product. The greater the proportion of alcohol added, the smaller the apparent density of the resulting aerogel. This is illustrated by the following table:

| | Gallons of alcohol added per lb. of $SiO_2$ | Concentration of $SiO_2$ in alcosol | Apparent density of aerogel |
|---|---|---|---|
| | | | Lbs./ft.³ |
| 1 | 3.06 | 3.89 | 2.2 |
| 2 | 1.87 | 5.66 | 3.10 |
| 3 | 1.76 | 5.93 | 3.20 |
| 4 | 1.64 | 6.20 | 3.50 |
| 5 | 1.29 | 7.25 | 4.45 |

The value of the product for heat insulating purposes, especially, is increased by the low density obtainable when a large proportion of alcohol is added to the sol.

It is obvious that other aerogels than silica may be prepared by the present process by the formation of the proper aquasol and dilution thereof with alcohol or other suitable organic solvent.

Other organic solvents than alcohol may be used provided they are miscible with water. For example, acetone, methyl alcohol, isopropyl alcohol, methyl, ethyl or butyl Cellosolve sols may be prepared by substituting the corresponding organic solvent for the alcohol in the previous experiment. If a pure aquasol is desired, the sodium sulfate or other inorganic salt may be removed by precipitating it with the organic solvent, then adding additional water to the organosol and removing the organic solvent by distillation, preferably under reduced pressure. Conversely, by adding the Cellosolve or other high boiling water-miscible solvent to an aquasol in the course of precipitating the sulfate, or to any of the other pure sols, the water may be removed by a vacuum distillation, leaving a dispersed colloidal silica in relatively pure organic media. Pure aquasols may also be obtained by preparing an acetone-aqua sol and then adding an equal volume of an alkyl acetate, for example, butyl acetate or ethyl acetate. A clear water sol separates as a lower layer containing about ninety-eight per cent. of the silica and only about sixty per cent. of the water originally present. This silica containing water layer may then be separated. Additional solvents which are miscible with the water-miscible organic solvent may be added to the aqua-organo sol; for example a water, alcohol, ether sol has been prepared in this way, also a water-Cellosolve-ethyl acetate sol.

*Example II.*—An aquasol is prepared as in Example I and the inorganic salt precipitated out by the addition of at least an equal quantity of alcohol. The sodium sulfate is then removed by decantation, filtration or centrifuging and additional water is added. The alcohol is then removed by distillation, preferably under reduced pressure to yield a pure, stable aquasol.

*Example III.*—An aquasol is prepared as in Example I and at least an equal quantity of acetone is added. The precipitated sodium sulfate is removed as above and a pure aqua-acetone sol obtained.

*Example IV.*—An aquasol is prepared as in Example I and sixteen hundred pounds of acetone is then added. The sodium sulfate crystals are then separated as in Example I and an equal volume of butyl acetate is then added to the clear acetone-aqua sol. A clear, colorless lower layer separates and may be drawn off at the bottom. It is a pure aquasol.

More water may be added to the acetone-aqua sol before addition of the acetate, in which case a more dilute sol is obtained in the lower layer, since approximately the same amount of water is retained by the acetone-acetate layer throughout relatively large variations in the total water originally present. Variations in the amount of acetate do not have an appreciable effect upon the distribution of the water in the two layers.

*Example V.*—An aqua-isopropyl alcohol sol is obtained by substituting isopropyl alcohol in Example I.

*Example VI.*—An aqua-Cellosolve sol is obtained by substituting Cellosolve in Example I. The sol so formed is then subjected to vacuum distillation to remove the water and a pure Cellosolve sol is obtained.

In addition to their use in the direct preparation of aerogels the organosols prepared as above are valuable film formers either alone or in combination with other coating materials. These organosols may also be dehydrated under atmospheric pressure in the usual way to form dried inorganic aerogels such as dried silica gel.

It is usually desirable in the preparation of these sols to operate slightly on the acid side and, for most purposes, at a pH of four. This makes possible a long period between the sol formation and the precipitation of the gel. If for any reason this acidity is objectionable, it may be neutralized either after or concurrently with the precipitation of the inorganic salt by adding a suitable quantity of an alkali, such as sodium hydroxide, dissolved in alcohol or other organic solvent. Where it is desirable, however, preparation may be carried out at a pH as high as six, since then also there is an appreciable period between sol formation and gelation, thus permitting removal of the inorganic salt.

The stability of the sols prepared in this manner is illustrated by the fact that an alcohol-water sol containing five per cent. $SiO_2$ by weight and having a pH of three showed no signs of gelation after standing for forty-three days.

From the foregoing description it will be apparent that this invention provides a new class of materials, namely, the organosols of water-miscible solvents, as well as permitting the preparation of aerogel products without the washing steps hitherto required. While the specific examples have been limited, in the interests of brevity, to sols and gels of silica, it will be apparent that other sols and aerogels may be prepared in a similar manner by precipitating out the inorganic salt formed by means of the addition of a quantity of a water-miscible organic solvent.

Reference is made herewith to my copending applications, Serial Number 441,212, filed April 30, 1942, and Serial Number 441,213, filed April 30, 1942, which relate to subject matter described but not claimed herein.

What I claim is:

1. The method of preparing an aerogel which comprises forming an aquasol containing a dissolved inorganic salt and a colloidal inorganic oxide, adding to the aquasol a quantity of a water-miscible organic solvent, removing the precipitated inorganic salt, and removing the liquid phase from the sol without substantially subjecting the sol to a compressive liquid-solid interface.

2. The method of preparing a silica aerogel which comprises forming a silica aquasol containing a dissolved inorganic salt, adding to the aquasol a quantity of alcohol, removing the precipitated inorganic salt and removing the liquid phase from the sol without substantially subjecting the sol to a compressive liquid-solid interface.

3. The method of preparing a stable organo-aqua sol composed of a colloidal inorganic oxide, an organic solvent and water, which comprises forming an aquasol containing a dissolved inorganic salt and a colloidal inorganic oxide, adding a quantity of a water-miscible organic solvent and removing the precipitated inorganic salt.

4. The method of preparing a stable silica organo-aquasol composed of colloidal silica, alcohol and water, which comprises forming an aquasol containing a dissolved inorganic salt and colloidal silica, adding a quantity of alcohol sufficient to precipitate the inorganic salt, and removing the precipitated salt.

5. The method of preparing a stable silica organo-aquasol composed of colloidal silica, acetone and water, which comprises forming an aquasol containing a dissolved inorganic salt and colloidal silica, adding a quantity of acetone sufficient to precipitate the inorganic salt, and removing the precipitated salt.

6. The method of preparing a stable silica organo-aquasol composed of colloidal silica, isopropyl alcohol and water, which comprises forming an aquasol containing a dissolved inorganic salt and colloidal silica, adding a quantity of isopropyl alcohol sufficient to precipitate the inorganic salt, and removing the precipitated salt.

7. The method of preparing a silica aerogel which comprises forming a silica aquasol containing a dissolved inorganic salt, adding to the aquasol a quantity of acetone, removing the precipitated inorganic salt and removing the liquid phase from the sol without substantially subjecting the sol to a compressive liquid-solid interface.

8. The method of preparing a silica aerogel which comprises forming a silica aquasol containing a dissolved inorganic salt, adding to the aquasol a quantity of isopropyl alcohol, removing the precipitated inorganic salt and removing the liquid phase from the sol without substantially subjecting the sol to a compressive liquid-solid interface.

9. The method of preparing an aerogel which comprises forming an aquasol containing a dissolved inorganic salt and a colloidal inorganic oxide, adding to the aquasol a quantity of a water-miscible organic solvent, removing the precipitated inorganic salt, and removing the liquid phase from the sol by confining said sol in an autoclave, heating it until it has reached a temperature at which the surface tension of the liquid phase is so small as to produce no substantial shrinkage of the solid phase when vapor is released therefrom and releasing the resulting vapor at a rate insufficient to injure the internal structure of the solid phase of the sol.

10. A stable organo-aquasol composed of a colloidal inorganic oxide, a water-miscible organic solvent and water, said sol containing at least 3.89% of said colloidal oxide and having a pH between about 3 and 6.

11. A stable ethyl alcohol-aquasol composed of a colloidal inorganic oxide, ethyl alcohol and water, said sol containing at least 3.89% of said colloidal oxide and having a pH between about 3 and 6.

12. A stable acetone-aquasol composed of a colloidal inorganic oxide, acetone and water, said sol containing at least 3.89% of said colloidal oxide and having a pH of between about 3 and 6.

13. A stable isopropyl alcohol-aquasol composed of a colloidal inorganic oxide, isopropyl alcohol and water, said sol containing at least 3.89% of said colloidal oxide and having a pH of between about 3 and 6.

14. A stable ethyl alcohol-aquasol composed of colloidal silica, ethyl alcohol and water, said sol containing at least 3.89% of said colloidal silica and having a pH of between about 3 and 6.

MORRIS D. MARSHALL.